Patented Feb. 4, 1947

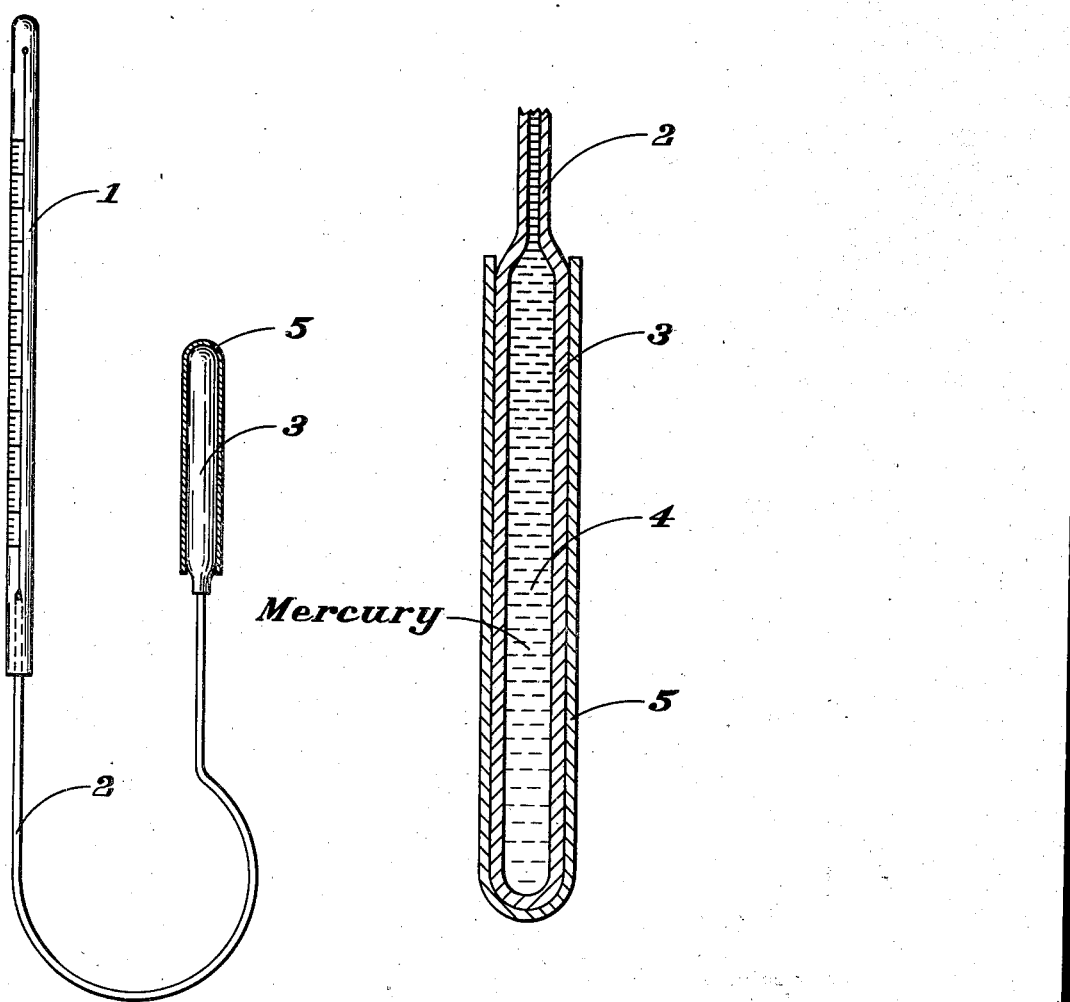

2,415,309

UNITED STATES PATENT OFFICE 2,415,309

THERMOMETER

Guy A. Stone, Rochester, N. Y., assignor to Taylor Instrument Companies, Rochester, N. Y., a corporation of New York Application September 13, 1943, Serial No. 502,390

2 Claims. (Cl. 297—3)

This invention relates to thermometers and more particularly to thermometers having a stem of combined glass and metal capillary tubing which communicates with a metal bulb.

While glass thermometers are widely used, they are especially susceptible to breakage. Furthermore, their stems are rigid so that a thermometer made to conform to one angular case, cannot be used in a case having a different angularity. Thus it was necessary to make a large number of glass stem thermometers differing only in angularity, in order to afford convenient legibility irrespective of the location of the thermometer bulbs.

It has been recognized that a thermometer having its capillary tube or stem made partly of glass so that the column of indicating fluid can be seen therethrough and made partly of metal so that it can readily be bent, would largely overcome the mentioned disadvantages. This arises from the fact that the limited length of the glass portion of the stem reduces the possibility of breakage and the metal portion of the stem is flexible to conform to any desired angle. Thus one thermometer can have any desired angularity. Such combined glass and metal stem thermometers have been passably accurate only where organic liquids, referred to as spirits, or other non-mercuric liquids, were used as the indicating medium. Where strict accuracy is essential, a thermometer should be filled with mercury to serve as the thermosensitive indicating medium. However, it has been found that where mercury was used as the indicating medium in a thermometer having a composite glass and metal stem joined to the metal bulb, the calibration of the thermometer changed with the passage of time due to the accumulation of gas in the bulb, especially when the thermometer bulb was placed in water or in an aqueous acid bath.

It has been discovered that where a steel thermometer bulb containing mercury is immersed in an aqueous solution and especially in an acid, aqueous solution, gaseous diffusion takes place through the wall of the bulb, with a consequent impairment of the accuracy of the thermometer. It is believed that this condition arises from the fact that hydrogen dissociates from the solution and in its nascent or atomic state passes through the ferrous wall of the bulb. Within the bulb the hydrogen atoms recombine to form molecular hydrogen which appears to lack the property of diffusing through ferrous metal. Thus molecular hydrogen accumulates in the bulb, where it displaces the mercury therein and impairs the accuracy of the thermometer.

In accordance with the main feature of the present invention, there is provided means for trapping gas such as hydrogen, before it diffuses through the wall of a thermometer bulb.

In accordance with another feature of the invention, a jacket is shrunk on a metal thermometer bulb so that although the adjacent surfaces of these parts are in extremely intimate contact, a microscopic space or spaces remain therebetween.

For a full understanding of the invention, and for other characteristic features thereof, reference is made to the accompanying drawing which forms part of the specification.

In the drawing, Fig. 1 is a front view of a thermometer made in accordance with the present invention, and Fig. 2 is a longitudinal section through the thermometer bulb and jacket of Fig. 1.

In the drawing the numeral 1 designates the indicating portion of a thermometer, which portion takes the form of a glass capillary tube sealed at its upper end. The lower end of the glass tube is sealed to the upper end of a metal capillary tube 2, the bore of which communicates with the bore of the glass stem. The lower end of the metal capillary tube has its bore communicating with the interior of a cylindrical metal bulb 3. The interior of the bulb and a part of the bore of the thermometer stem are filled with mercury 4, or other thermosensitive medium having similar properties. Since mercury is used as the filling medium of the thermometer, it is essential that the lower or metal portion 2 of the stem, as well as the bulb 3, be made of a material with which mercury does not amalgamate. A metal which satisfies these requirements is steel and various alloys thereof which are herein referred to as ferrous metal.

In order to prevent gas from diffusing through the metal wall of the bulb and thereby accumulating within the thermometer to impair the accuracy thereof, a trap is provided surrounding the bulb. This trap in its preferred form, comprises a cylindrical jacket 5, inclosing that portion of the bulb which would normally be immersed in the liquid, the temperature of which is to be indicated. This jacket is preferably made of metal such as aluminum or a ferrous metal which can be shrunk on to the bulb in such intimate contact therewith that there is only microscopic space or spaces between these two parts. Thus the interior diameter of the jacket is approximately the same as the outside diameter of the bulb, especially in the range of temperatures to which these parts are subjected during normal use. In applying the jacket to the bulb, it is preferred to heat the jacket to a relatively high temperature, causing it to expand. When the jacket is in this expanded condition, the bulb is inserted therein. After the bulb and the jacket thereon cool to room temperature, the adjacent walls of these parts are in such intimate contact that any remaining spaces therebetween are substantially microscopic. It possibly may be helpful in visualizing the space or spaces to understand that, although the outer surface of the bulb and the inner surface of the jacket are finished so that they would be considered as smooth, nevertheless there will be minute hills and valleys in these surfaces, the valleys constituting the space or spaces between the mentioned parts.

With this construction, when the jacketed bulb is immersed in an aqueous solution, the nascent or atomic hydrogen diffuses through the wall of the jacket into the space between the jacket and the bulb. There the atomic hydrogen will combine to form molecular hydrogen which appears to be unable to diffuse through a ferrous wall and consequently cannot pass into the interior of the bulb. It will be understood that this molecular hydrogen as it accumulates in the space between the bulb and the jacket, will escape through the mouth 5 of the jacket.

While the present disclosure relates to a combined glass and metal thermometer, it will be understood that the invention is not so limited but is also applicable to any mercury-filled thermosensitive tube system which utilizes a metal bulb.

I claim:

1. A cylindrical ferrous metal bulb for a measuring instrument, a mercury filling medium in said bulb, and a separate cylindrical jacket having its inner surface in such intimate contact with the major part of that portion of the surface of the bulb which is normally immersed in the solution to be tested, that these surfaces are frictionally locked together.

2. A cylindrical ferrous metal bulb for a thermosensitive device, a mercury filling medium in said bulb, and a separate cylindrical ferrous jacket on that portion of the surface of the bulb which is normally immersed in the solution to be tested, the internal diameter of said jacket and the outside diameter of the portion of the bulb cooperating therewith being approximately equal whereby the fit between these parts is comparable to that obtained by shrinking the jacket on the bulb.

GUY A. STONE.

REFERENCES CITED

The following references are of record in the file of this patent:

UNITED STATES PATENTS

| Number | Name | Date |
|---|---|---|
| 1,811,190 | Tate | June 23, 1931 |
| 1,733,804 | Ileman | Oct. 29, 1929 |
| 199,442 | Huddeston | Jan. 22, 1878 |
| 1,638,832 | Sartakoff | Oct. 23, 1928 |
| 1,385,661 | Boyce | July 26, 1921 |
| 1,765,387 | Warner | June 24, 1930 |
| 1,035,952 | Dunwody | Aug. 20, 1912 |
| 2,083,876 | Snediker | June 15, 1937 |

FOREIGN PATENTS

| Number | Country | Date |
|---|---|---|
| 153,847 | German | Sept. 9, 1904 |

OTHER REFERENCES

Rhodes, pages 46 and 47 of "Industrial Instruments for Measurement and Control." First edition published 1941 by The McGraw-Hill Book Co., New York city. (Copy in Div. 30.)

Bristol, pages 48, 49, 65 and 78 of Catalog No. 1252 entitled "Bristol's Thermometers" published April 1941 by the Bristol Co., Waterbury, Conn. (Copy in Div. 30.)